Jan. 29, 1929.  
J. DE FRANCISCI  
MACARONI PRESS  
Filed Oct. 31, 1924

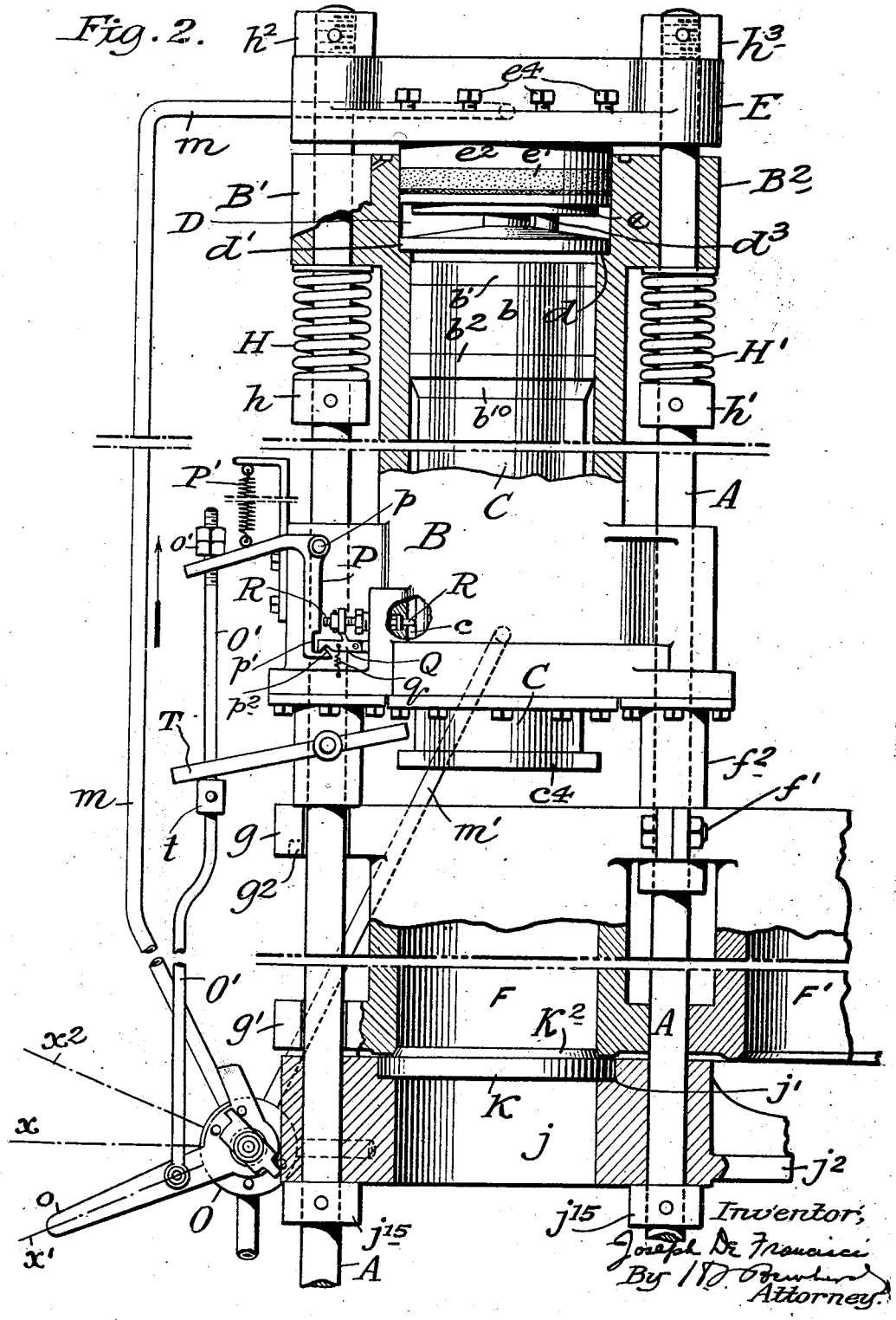

Jan. 29, 1929.                J. DE FRANCISCI                1,700,671
                              MACARONI PRESS
                           Filed Oct. 31, 1924          4 Sheets-Sheet 3
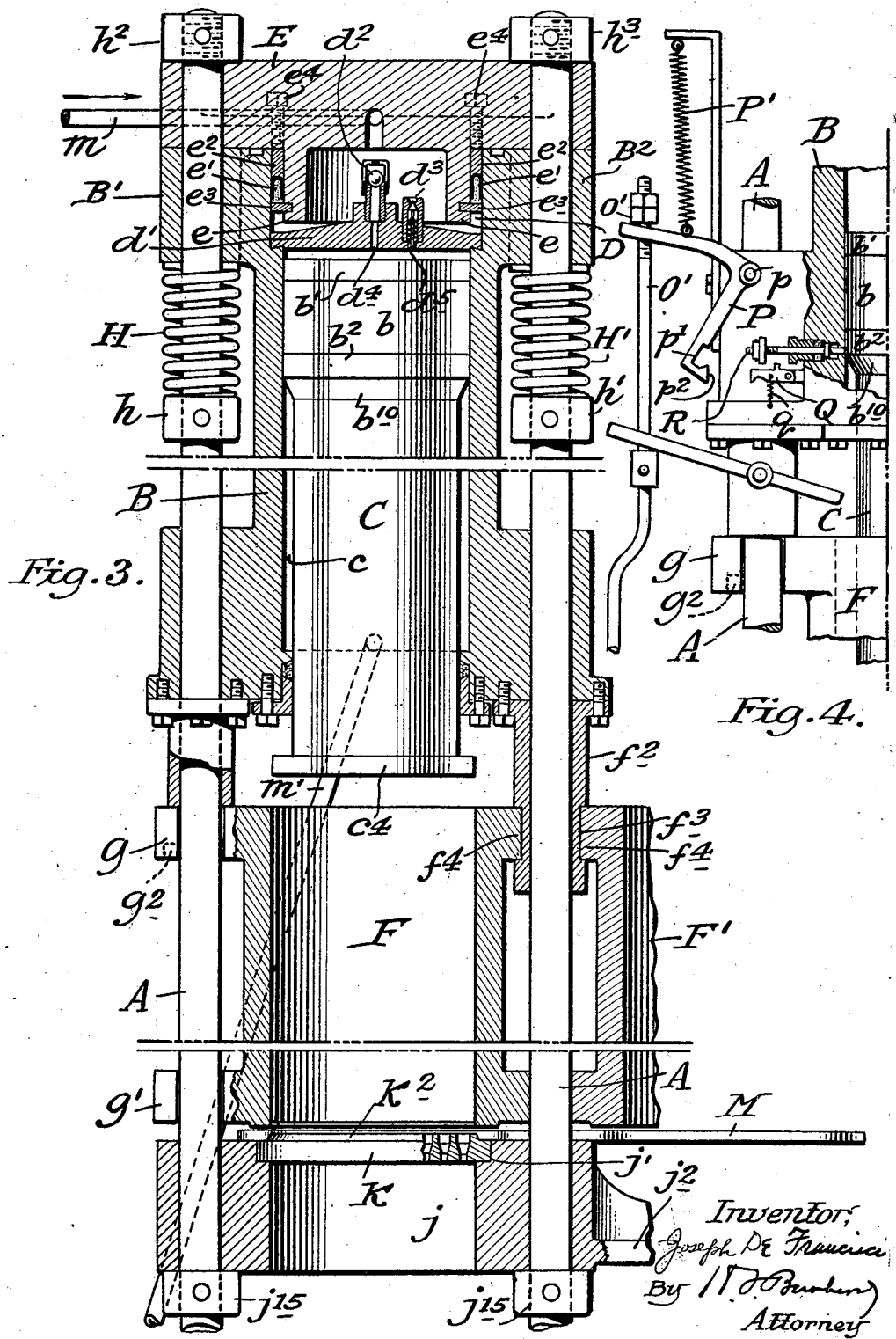

Jan. 29, 1929.  1,700,671
J. DE FRANCISCI
MACARONI PRESS
Filed Oct. 31, 1924  4 Sheets-Sheet 4

Inventor,
Joseph De Francisci
By (signature)
Attorney

Patented Jan. 29, 1929.

1,700,671

UNITED STATES PATENT OFFICE.

JOSEPH DE FRANCISCI, OF BROOKLYN, NEW YORK, ASSIGNOR TO CONSOLIDATED MACARONI MACHINE CORPORATION, OF NEW YORK, N. Y., A CORPORATION OF NEW YORK.

MACARONI PRESS.

Application filed October 31, 1924. Serial No. 746,920.

This invention is a press or machine for producing macaroni, spaghetti, and analogous products.

One feature of my present invention embodies a novel structure whereby the expressing die may be conveniently cleaned or scraped, after each operation of the dough-extruding stroke of the power plunger.

A further improvement is the provision of a stationary support for a flat surfaced extruding die, which support is positioned in vertical alinement or registration with a yieldably mounted power cylinder and in a plane slightly below a reversible dough cylinder.

Another improvement consists of dough boards or tables positioned to receive the mass of dough should it tend to become dislodged from a dough cylinder in the operation of moving said cylinder into alinement with a power cylinder. Said tables act also to receive and hold pieces of dough which may fall from the underside of a charged dough cylinder as the latter is turned around under the plunger and is locked in position to aline with the power cylinder.

Another improvement is a bottom member or head for the idle or empty dough cylinder adapted for use in the charging operation, which bottom member is capable of being dropped down out of the lower end of said cylinder, after the dough charge is packed therein.

Another improvement comprises a plurality of fixed standards, herein shown as parallel posts, supporting a power cylinder which is provided at the top with a pressure chamber, the diameter of which pressure chamber exceeds the internal diameter of said power cylinder. This pressure chamber is separated from the power cylinder by an intermediate head, the latter being positioned to divide the chamber of the power cylinder from said pressure chamber. The power cylinder is itself closed by a head formed with an annular flange spaced from the side wall of the pressure chamber, and a packing is interposed between the flange and the side wall and said packing is confined in place by a sectional ring carried by the annular flange, said cylinder head being fixedly attached by clamping bolts threaded through the chamber head and bearing on a metal ring resting on a compressible packing.

The power cylinder of my press is enlarged in diameter at the upper part to constitute a pressure chamber within which the pressure of the motive fluid is adapted to increase or accumulate. The upper end of said power cylinder is separated from the pressure chamber by a head resting upon an annular seat or shoulder, and this head is provided with inlet and outlet valved passages through which the fluid under pressure is adapted to flow in the operation of the machine.

The power cylinder is yieldingly supported within the press frame by appropriate coiled springs, or their equivalents, and in the service of the press, said springs normally act to sustain the power cylinder and a dough cylinder connected therewith in a raised position so that the dough cylinder is free from contact with the extruding die and is free to swing over said die. Now when the press is started into action, the motive fluid is forced into the pressure chamber at the top of the power cylinder, the same being above the working or plunger chamber of said power cylinder, and the pressure of this fluid accumulates or is built up within the pressure chamber until the resistance of the springs, or their equivalents, is overcome, thus causing the connected power cylinder and dough cylinder to be forced downward within the press frame and thereby seat the dough cylinder into tight contact with the extruding die or its support. The motive fluid continues to increase in pressure within the pressure chamber until the resistance of a spring needle valve is overcome, and thereupon the pressure of the motive fluid results in the flow slowly of such fluid into the working chamber of the power cylinder, to force the power plunger downwardly, but the seal of the dough cylinder with the die must be completed before the needle valve opens and the fluid admitted to the working chamber of the power cylinder.

The power plunger is provided with a cam face, or tapered shoulder below the head of said plunger, and this cam face is adapted to operate a valve-reversing latch-mechanism which includes a slidable trip pin, the latter being positioned during the power stroke of the plunger into the path of the lower face on said power plunger. This trip piece is forced outwardly by the cam face on the plunger as the latter reaches the lowermost point of its travel, thereby tripping said latch to release a pull spring which operates to reverse the pressure control valve by which fluid is admitted for raising the power plunger to its starting point.

The power cylinder and either of the dough cylinders are adapted to be connected together for conjoint movement by a sleeve connection. A pair of springs, coiled about the standards, serve to yieldingly support the parts in a position so that the lower ends of the dough cylinders when turned are slightly above, and pass freely over, the expressing die, the latter having a flat upper surface and being provided usually with a beveled marginal face adapted to interlock with a corresponding beveled face in the lower end of either of said dough cylinders when pressure is accumulated within the pressure chamber sufficient to overcome the resistance of the cylinder-supporting springs.

Numerous advantages inherent in my invention, both in structure and function, other than those enumerated, will appear from the following description taken in connection with the drawings, wherein—

Figure 2 is a vertical section, partly in elevation, on an enlarged scale of the press, with the parts in the position assumed at the starting of the power stroke of the plunger.

Figure 3 is a central vertical sectional view partly in elevation, showing the valve mechanism employed in connection with the pressure head at the top of the power cylinder.

Figure 4 is a fragmentary detail view showing the power plunger at the limit of its down stroke, with the latch-controlling trip-pin forced outwardly and the latch parts in the tripped position.

Figure 1:
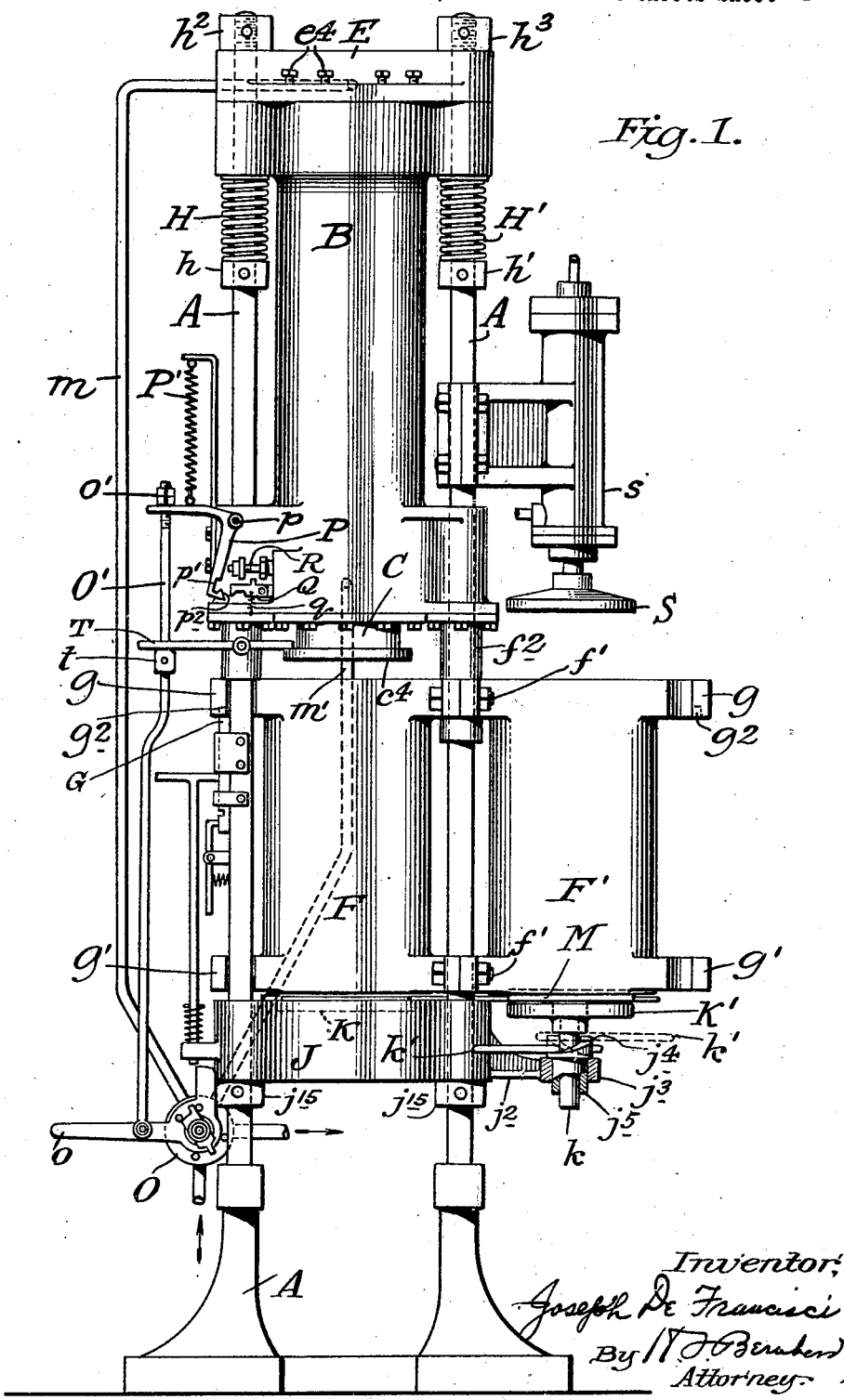
Figure 1 is an elevation of a macaroni press embodying my invention.

Mounted in a frame A is a power cylinder B, within which operates a power plunger C, the diameter of which for a part of its length is slightly less than the internal diameter of said power cylinder, thus producing an intermediate annular space $c$. At its upper end, the plunger is provided with a piston head $b$ having packing rings $b'$ $b^2$, of any suitable character. At the lower end said plunger protrudes below the power cylinder and is provided with a flange $c^4$, with which co-operates means for shifting a valve mechanism, as will be hereafter explained.

The upper part of the power cylinder is counterbored to produce a pressure chamber D, the internal diameter of which exceeds the internal diameter of the working chamber in which operates the power plunger C. This enlargement of the pressure chamber D provides a seat or shoulder $d$ on which rests a pressure head $d'$. This head carries an outlet valve $d^2$, and a spring pressed inlet valve $d^3$, said valves controlling the flow of fluid through passages $d^4$ and $d^5$, respectively. As shown, the outlet valve $d^2$ is retained within a suitable cage, whereas the inlet valve is in the form of a needle valve, but any type of valve may be used.

The pressure cylinder is itself closed at its top by a cylinder head E, which is shown as having a depending annular flange $e$, the diameter of which is less than the internal diameter of the pressure chamber D above the pressure head $d'$ which separates the pressure chamber from the working chamber of the power cylinder. This depending flange enters the pressure chamber, and said flange is spaced from the annular wall of said chamber. A packing $e'$ is interposed between the flange and the wall of said chamber, said packing being compressed between top and bottom metal rings $e^2$, $e^3$, by clamping bolts $e^4$ which are threaded through the cylinder head and engage the upper ring $e^2$. The lower ring $e^3$, is of sectional construction, and it is received within a circumferential groove $e^5$, cut in the outer wall of the head flange.

The construction at the upper part of the power cylinder herein described constitutes an important part of my invention, and embodies a structure possessing great strength and which acts effectively to seal the pressure chamber against fluid leakage under high pressure working conditions.

F F' are dough cylinders coupled at $f'$ and fitted on a sleeve $f^2$, the latter being bolted to the power cylinder B, and said sleeve being slidable on one of the standards of frame A. The dough cylinders are free to turn on the sleeve for the purpose of positioning one or the other of the cylinders into vertical alinement with the power cylinder B. The sleeve $f^2$ is provided near its lower end with an annular groove $f^3$ for receiving the shoulders $f^4$ of the cylinders, to lock the power cylinder and either of said dough cylinders in vertical fixed relation. It will be understood that each dough cylinder is open throughout its length and at its ends, and that each cylinder has outwardly directed lugs $g$ $g'$, adapted to fit around one of the frame standards when said dough cylinder is in alignment with the power cylinder, each of the lugs $g$ being provided with a notch $g^2$, adapted to be engaged by a slidable latch G.

The power cylinder, and the dough cylinders connected therewith by the sleeve $f^2$, are supported as a unit on heavy springs H H', which loosely encircle the frame posts A and rest upon collars $h$ $h'$ fixedly attached to said frame posts, said springs bearing upwardly against side extensions B', B², of the power cylinder B. The cylinder head E is retained in position by collars $h^2$, $h^3$, fixed to the posts A of the press frame.

The expressing die K is provided with a flat upper surface, see Figure 3, and said die is fixedly supported in a die-block J, provided with a central opening $j$, and with a groove $j'$ formed in the upper edge of said die-block concentric with said groove which receives said die K. The die-block J rests upon collars $j^{15}$ fixedly attached to the frame posts A for removably and fixedly holding said block in position for supporting said die.

From the side of block J extends an arm $j^2$, formed at the end with a bearing $j^3$, for a cam $j^4$, which is carried on a tubular member or sleeve $j^5$ extending through said bearing and held therein against rotation. A head K' is carried on a vertical stem $k$, the latter being rotatable in the sleeve $j^5$ by manipulating a handle or bar $k'$. The head K' may be raised by turning the handle $k'$, which contacts with, and rides upon, the face of the cam $q^4$, and said head is adapted to be lowered by reversing the movement of said handle, as indicated in Figure 1 of the drawings.

Figure 5:
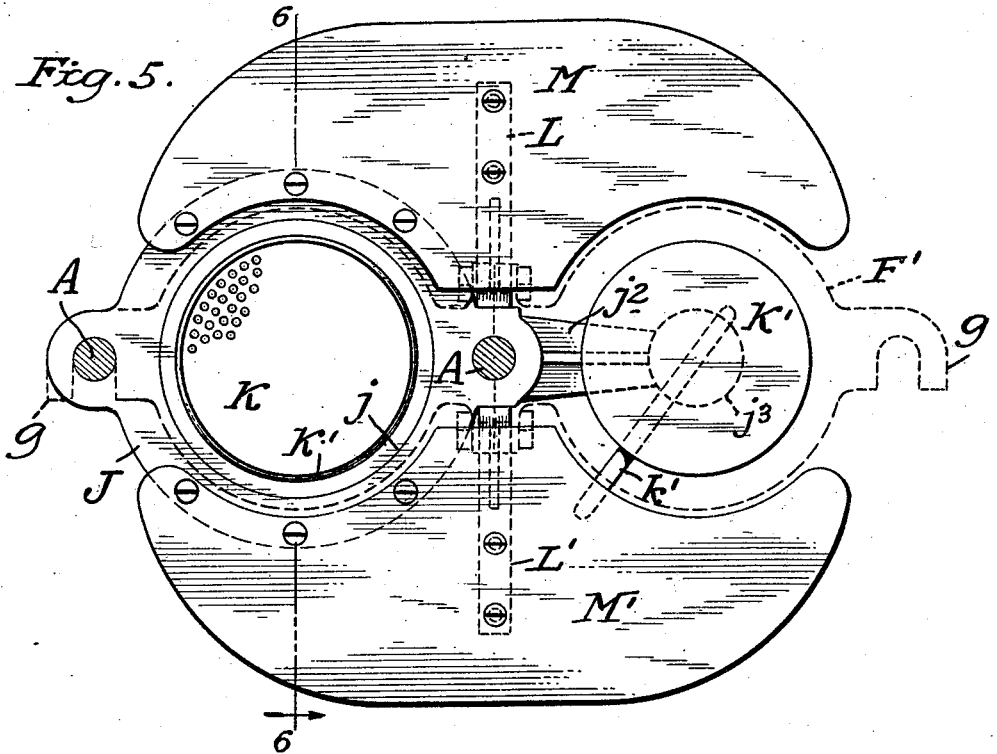
Figure 5 is a cross sectional plan view taken on a line just above the expressing die and showing a plurality of dough boards or tables attached to the machine frame.
Figure 6:
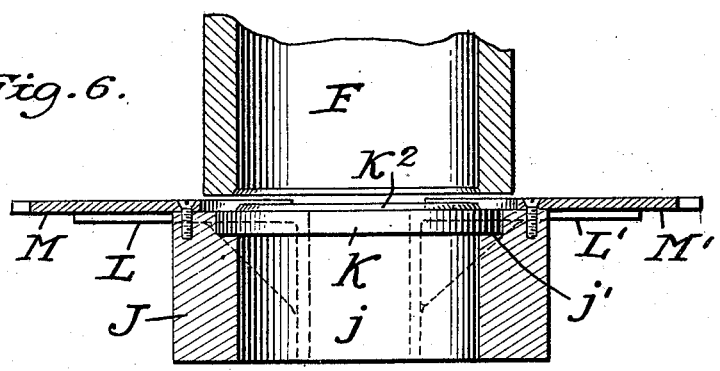
Figure 6 is a detail vertical cross sectional view on the line 6—6 of Figure 5.

Bolted or otherwise attached to the die-block J, and to oppositely extending brackets L L' are a plurality of horizontally arranged boards or tables M M', see Figures 5 and 6. These tables are positioned below the charging cylinders, and they hold the mass of dough, or the pieces of dough, which may fall from the dough which is contained within a charged or filled cylinder F or F' when said cylinder is turned into a position beneath the power plunger prior to expressing the material from said charged cylinder.

These tables, and each of them, are important elements in my machine for the reason that they serve to receive and hold the mass of dough should the latter become dislodged from either dough cylinder in the course of the movement of the cylinder or cylinders from the charging (filling) position to the alined relation with the power cylinder. Furthermore, I may use a single table, or a double table when two dough cylinders are used, and the table or tables perform the further function of receiving and holding pieces of dough which may drop from the dough cylinder or cylinders during the swinging movement thereof. The use of the table or tables in connection with my press tends to secure economy in the operation of the press, because they preclude the mass of dough from sliding out of the dough cylinder and lodging upon the floor of the room within which the press is located; and, furthermore, the pieces of dough which drop from the cylinders are caught on the tables, so that the floor remains in a clean sanitary condition.

As shown, the tables are in a horizontal plane below the dough cylinders, and they are supported fixedly in position adjacent the path of the lower ends of said cylinders when the latter are swung on the vertical axis afforded by the frame A on which the sleeve $f^2$ is rotatably fitted. The tables extend outwardly from the die-block J, and they are positioned to intercept the mass of dough, or to catch pieces of dough, which may become dislodged from a charged cylinder at a time when the cylinders are moved from the charging position to the expressing position.

As shown, the extruding die K is provided with a top flat surface. As is usual in the art, said die has an upstanding flange or rim $K^2$, the outer face of which is beveled, as shown in Figures 2 and 3. This beveled rim of the die is of a diameter which adapts said rim to fit snugly in the lower open end of the dough cylinder F or F', when said dough cylinder is in alinement vertically with the power cylinder and with the extruding die.

The power cylinder and the dough cylinders are free to have a limited vertical travel on the press frame upon the compression of the heavy coiled springs H H' prior to the downward power stroke of the plunger C, as a result of which the dough cylinder F or F' is movable downward by fluid pressure with respect to the die K so that the beveled rim $K^2$ enters said cylinder at the lower end, and thus seals the connection between the die and the dough cylinder prior to the descent of the power plunger, for precluding the dough from passing through the joint between the cylinder and the extruding die or its die-block.

As disclosed in my prior Patent No. 1,502,021, the plunger is moved up and down within the power cylinder B by fluid pressure, and for this purpose I employ a single reversible valve O and pipe connection $m$, $m'$, leading from said valve O to the upper part and the lower part, respectively, of the power cylinder. In the neutral position of the valve O, indicated by the dotted line $x$ in Figure 2, no fluid pressure flows through the valve to either end of the power cylinder; with the valve moved to the full line position $x'$ of Figure 2 fluid flows through pipe $m$ to the upper part of the cylinder for applying pressure to the plunger and thus impart the power stroke thereto; but with the valve shifted to the dotted line position $x^2$ in Figure 2, the valve controls the flow of pressure by shutting off the flow through pipe $m$ and directing the flow through pipe $m'$ to the lower part of the cylinder for raising the plunger at an increased speed as compared with the speed of movement on the descending power stroke of the plunger.

The control valve O is provided with an operating handle $o$, to which is pivoted a rod O', extending upwardly to and above the lower end of the power cylinder B, said rod being provided at its upper end with a stop $o'$. An angular latch P is pivoted at $p$ to the press frame or the cylinder B, one arm of this latch is fitted loosely on the valve rod O' for engagement with the stop o' thereof, whereas the other depending arm of the latch is provided with a notch p' and with protruding cam face $p^2$, see Figures 2 and 4. To the pivoted angular latch P is connected a coiled spring P'. In directing the fluid into the upper part of the power cylinder B the free notched end of the angular latch is engageable with stop member Q shown as a pivoted element controlled by a spring q, and this stop member co-operates with the latch P for retaining the spring P' under tension, said latch P operating to retain the valve rod O' in a raised position, and thus the valve O is retained in the position to direct the flow of fluid to the upper part of the power cylinder. A latch releasing member R in the form of a trip pin co-operates with the latch P, said trip pin being slidable in the power cylinder at the lower part thereof. The outer end of the trip pin is adapted for contact with the angular latch P, whereas the inner end of the trip pin when in a set position, extends into the space c between the plunger B and the cylinder wall, so that said inner end of the trip pin is in the path of the beveled face $b^{10}$ of the plunger. On the power stroke of the plunger, it is forced downwardly by the fluid pressure, and the trip pin and the latch remain in the position of Figure 2, but as the plunger approaches the limit of its downward travel, the trip pin is engaged by the bevel face of the plunger, the effect of which is to press the trip pin outwardly and thus shift the latch for its notched lower end to be disengaged from the stop member Q, and thereupon the spring expands for pulling the latch and the valve rod upwardly, as in Figure 4, the result of which is to shift the valve O and thus reverse the flow of fluid by closing the flow to pipe m and opening the flow to pipe m', whereby the control valve is reversed automatically by devices responsive to the travel of the plunger.

The operation is apparent from the foregoing description taken in connection with the drawings, but may be summarized briefly as follows: The material is filled in one of the cylinders F or F', the lower end of which is closed by the bottom head K' which is lifted quickly into place by moving handle k', resting on cam $j^4$, from the full line to dotted line position of Figure 1, and such material is packed into said cylinder by the downward movement of a compacting head S on a plunger rod and piston operable within a fixed cylinder s, and thereafter the connected cylinders F F' are turned horizontally for the charged cylinder to be alined vertically with the power cylinder B. The control valve is now shifted to the full line position of Figure 2 for directing the motive fluid through pipe m into the pressure chamber D above the pressure head d. The fluid fills the chamber D and the continued supply of fluid increases the pressure within the chamber, the pressure being accumulated or built up in said chamber until the resistance of the springs H H' is overcome, the result of which is to cause the power cylinder and the dough cylinders to slide downwardly for a limited distance. The lower end of the dough cylinder F or F' is thus seated by the energy of fluid pressure built up in the chamber D so as to secure a sealed connection between said dough cylinder and the extruding die before the motive fluid is admitted to the working chamber of the power cylinder. The beveled rim of the die $K^2$ enters the lower end of the charged cylinder, and thus forms tight connection between the cylinder and the die for precluding the escape of the material. The pressure continues to accumulate within the chamber D until it overcomes the resistance of the spring associated with the needle valve, and thus the motive fluid is admitted to the working chamber of the power cylinder to force the plunger downward. The descent of the plunger upon the material extrudes the latter through the die, and as the plunger approaches the lower limit of its movement within the power cylinder, the beveled cam face $b^{10}$ contacts the inner end of the trip pin, forcing it outwardly and using the angular latch to disengage it from the detent, whereupon the spring lifts the angular latch and the valve rod to thereby shift the control valve, the result of which is to arrest the flow of liquid through pipe m, and thus direct the liquid through pipe m' into the lower part of the power cylinder. The plunger is raised by the energy of the liquid supplied to the space c, whereupon the liquid present in the cylinder flows through the check valve $d^2$ and thence by chamber D through pipe m. As shown, the upward travel of the plunger brings the lower flange $c^4$ into contact with a trigger T, which acts on a collar t of the valve rod to shift the control valve to a neutral position, thus arresting the operation of the press.

It is apparent that the extruding die is seated detachably upon the die block, and that ready access may be had to said die when the material cylinders F F' are swung around, so that the die and the flat upper face thereof may be cleaned while it rests upon the die-block, or said die may be removed, cleaned, and replaced.

In my invention the power cylinder is provided with a chamber D which may be said to be separate from the working chamber. This separate chamber D is usually isolated from the working chamber by the head d', although said head may be omitted, but in practice it is used. Said separate chamber D, herein referred to as the pressure chamber, is of greater cross sectional area than the working chamber of the power cylinder, and this separate chamber is useful in that it affords a space within which the pressure is built up or accumulated for the purpose of imparting the downward limited travel to the power cylinder and the dough cylinders, whereby the desired tight connection between the dough cylinder and the extruding die is obtained prior to the downstroke of the plunger.

In my invention a characteristic feature consists in the use of cushion springs H H', or their equivalent for yieldably supporting the power cylinder and the dough cylinders connected therewith. Again, the power cylinder is provided with a pressure chamber D, the diameter of which exceeds the internal diameter of the working chamber in which travels the power plunger C. When the press is in service, the pressure of the fluid is "built up" or accumulates in the chamber D until the resistance of the springs H H' are overcome, and thus a downward travel, to a limited extent, is imparted to the connected power and dough cylinders, the effect of which is to seat the dough cylinder upon the extruding die and to attain a sealed connection therebetween prior to the descent of the power plunger.

Having thus fully described the invention, what I claim as new and desire to secure by Letters Patent is:

1. In a machine of the class described, a power cylinder and a dough cylinder movable as a unit relatively to a press frame, a power plunger, an extruding die upon which the dough cylinder is adapted to be seated, means for retaining said connected cylinders in a raised position, and fluid operated means for imparting sliding movement to said cylinders for seating the dough cylinder relatively to the die prior to the extruding stroke of said power plunger.

2. In a machine of the class described, a power cylinder and a plunger movable therein, a pressure chamber within said cylinder of increased cross sectional area and within which the pressure of a motive fluid is adapted to be built up for attaining a high pressure therein, cushion means opposing the movement of said power cylinder, and a dough cylinder connected with the power cylinder for unitary sliding movement therewith.

3. In a machine of the class described, a die, a material cylinder movable into and out of service relation to said die, means for slidably moving said material cylinder relatively to the die, and fluid operated means for seating said material cylinder relatively to the die.

4. In a machine of the class described, a power cylinder slidable relatively to a press frame, said power cylinder having a chamber within which the pressure of a motive fluid is adapted to be built up, cushion means for said cylinder, a plunger, a material cylinder connected with said power cylinder for sliding movement therewith, a die-block, and an extruding die provided with means for engagement with said material cylinder upon the sliding travel of said cylinder with the power cylinder in opposition to the resistance of said cushion means.

5. In a machine of the class described, a power cylinder slidable relatively to a press frame, said power cylinder having a chamber within which the pressure of a motive fluid is adapted to accumulate, cushion means for said cylinder, a plunger, a material cylinder connected with said power cylinder for sliding movement therewith, a die-block, and an extruding die adapted for engagement with said material cylinder upon the sliding downward movement thereof for producing a tight material-excluding connection between the material cylinder and the extruding die.

6. In a machine of the class described, a power cylinder provided with a pressure chamber the cross sectional area of which exceeds the cross sectional area of the working chamber therein, and within which pressure chamber the pressure of the motive fluid is adapted to accumulate, means for slidably supporting said power cylinder, means opposing the sliding movement of said cylinder, a power plunger, a material cylinder movable as a unit with the power cylinder, and a die upon which the material cylinder is adapted to be seated by the energy of the pressure prior to the stroke of the power plunger.

7. In a machine of the class described, a power cylinder, a material cylinder, a power plunger, means for slidably supporting said cylinders, a die upon which the material cylinder is adapted to be seated, a yieldable resistance opposing said sliding movement, and fluid operated pressure means whereby the material cylinder is seated upon the die prior to the stroke of the power plunger.

8. In a press, the combination of a power cylinder, a die, means for yieldably supporting said power cylinder for slidable motion relatively to said die, reversible material cylinders, means for connecting said material cylinders with said power cylinder for sliding movement therewith relatively to said die, said material cylinders being reversible relatively to the power cylinder and the die, and fluid pressure means for moving said power cylinder and the material cylinders toward the plane of said die.

9. In a press, a power cylinder, a die, means for supporting said power cylinder for sliding motion relatively to the die, means opposing said sliding motion of the power cylinder in one direction, a plurality of material-cylinders, means connecting said material-cylinders with said power cylinder for effecting a conjoint sliding motion of the material cylinders with the power cylinder, said connecting means having the capacity of permitting a rotary motion of the material cylinders with respect to the die and to the power cylinder in the out-of-service relation of said material cylinders with respect to the die, and fluid means for moving said power cylinder and the material cylinders toward said die whereby either of said material cylinders may be seated in a tight relation to said die.

10. In a machine of the class described, a die, a material cylinder slidable and rotatable relatively to the die, yieldable means for lifting the cylinder with a sliding motion away from the die, and fluid means operable for moving said cylinder slidably toward the die when in service relation to said die, whereby said cylinder is seated relatively to the die.

11. In a machine of the class described, a press frame, a power cylinder fitted thereto for a limited sliding movement, cushion springs opposing said sliding movement of the power cylinder, a material cylinder connected with the power cylinder for sliding movement therewith, a plunger, a die, and means whereby the energy of a fluid is built up or accumulated to overcome the resistance of the cushion springs and impart sliding movement to the connected cylinders.

12. In a press, the combination with a material cylinder, and a table over which said material cylinder is movable, of a follower movable with a rising motion to enter and close the bottom portion of said material cylinder, a quick-acting cam below said follower, and actuating means co-operable with the follower and positioned for contact with said cam whereby a single motion of said actuating means imparts a quick rise and fall to said follower.

In testimony whereof I have hereto signed my name this 30th day of October, 1924.

JOSEPH DE FRANCISCI.